United States Patent [19]

Smutny et al.

[11] Patent Number: 5,028,652
[45] Date of Patent: Jul. 2, 1991

[54] STABILIZED POLYMER COMPOSITIONS OF LINEAR ALTERNATING POLYKETONES AND ZINC ALUMINATE

[75] Inventors: Edgar J. Smutny, Houston; Lynn H. Slaugh, Cypress, both of Tex.

[73] Assignee: Shell Oil Company, Houston, Tex.

[21] Appl. No.: 474,919

[22] Filed: Feb. 5, 1990

[51] Int. Cl.$^5$ .......................... C08K 3/10; C08L 23/00
[52] U.S. Cl. .................................. 524/434; 525/185; 525/539
[58] Field of Search ................ 524/434; 525/185, 539

[56] References Cited

U.S. PATENT DOCUMENTS

| | | | |
|---|---|---|---|
| 3,694,412 | 9/1972 | Nozaki | 260/63 CQ |
| 3,959,208 | 5/1976 | Baskin | 524/403 |
| 4,740,423 | 4/1988 | Kadokura et al. | 428/403 |
| 4,874,819 | 10/1989 | George et al. | 525/185 |

FOREIGN PATENT DOCUMENTS 121965 10/1984 European Pat. Off. .
257663 3/1988 European Pat. Off. .

OTHER PUBLICATIONS

Wang, J. H. and C. Wu; Cheng-kung Ta Hsueh Pao, K'o Chi, I. Hsueh Pien, vol. 20, pp. 157–177.

*Primary Examiner*—John C. Bleutge
*Assistant Examiner*—Thomas Hamilton, III
*Attorney, Agent, or Firm*—James O. Okorafor

[57] ABSTRACT

Stabilized polymer compositions comprise a linear alternating polymer of carbon monoxide and at least one ethylenically unsaturated hydrocarbon incorporating a stabilizing quantity of a zinc aluminate and, optionally, an acidic polymer containing moieties of an α-olefin and an α,β-ethylenically unsaturated carboxylic acid. The compositions demonstrate improved melt stability.

17 Claims, No Drawings

STABILIZED POLYMER COMPOSITIONS OF LINEAR ALTERNATING POLYKETONES AND ZINC ALUMINATE

FIELD OF THE INVENTION

This invention relates to stabilized compositions comprising linear alternating polymer of carbon monoxide and at least one ethylenically unsaturated hydrocarbon. More particularly, the present invention comprises the linear alternating polymer stabilized against undue loss of crystallinity upon melting and solidification by the inclusion therein of a zinc aluminate and, optionally, an acidic polymer.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of the linear alternating polymers, now becoming known as polyketones or polyketone polymers, are illustrated by a number of published European Patent Applications including 121,965, 181,014, 213,671 and 257,663. The process typically involves the use of a catalyst composition formed from a compound of palladium, cobalt or nickel, the anion of a strong non-hydrohalogenic acid and a bidentate ligand of phosphorus, arsenic or antimony.

The resulting materials are relatively high molecular weight thermoplastic polymers having established utility as premium thermoplastics in the production of shaped articles such as containers for food and drink by procedures which are conventionally employed with thermoplastics. Although the linear alternating polymers are crystalline with well defined melting points, the polymers do tend to lose crystallinity to some extent when exposed to multiple melting/solidification cycles. This apparent loss of crystallinity results in decreases of certain of the desirable properties of the polymers. Stabilization against undue loss of crystallinity of the polyketone polymers in the presence of aluminum stearate is shown by copending U.S. patent application Ser. No. 358,218, filed May 30, 1989 U.S. Pat. No. 4,954,555. Similar stability in the presence of aluminum phenoxide is shown by copending U.S. patent application Ser. No. 351,369, filed May 15, 1989 U.S. Pat. No. 4,950,703. The presence of aluminum hydrogels in polyketone polymers is shown by copending U.S. patent application Ser. No. 338,011, filed Apr. 14, 1989. It would be of advantage to provide other compositions of the linear alternating polymers which have been stabilized against loss of crystallinity upon melting/solidification cycles. Expressed differently, it would be of advantage to provide compositions of the linear alternating polymers which exhibit improved melt stability.

SUMMARY OF THE INVENTION

This invention provides compositions comprising linear alternating polymers of carbon monoxide and at least one ethylenically unsaturated hydrocarbon which are stabilized against undue loss of crystallinity upon melting and crystallization. More particularly, the invention provides such compositions which are stabilized against such undue loss of crystallinity by the inclusion therein of a zinc aluminate and, optionally, an acidic polymer containing moieties of an α-olefin and an α,β-ethylenically unsaturated carboxylic acid.

DESCRIPTION OF THE INVENTION

The polymers which are stabilized against undue loss of crystallinity upon melting/solidification are linear alternating polymers of carbon monoxide and at least one ethylenically unsaturated hydrocarbon. The ethylenically unsaturated hydrocarbons which are useful as precursors of the polyketone polymers have up to 20 carbon atoms inclusive, preferably up to 10 carbon atoms inclusive, and are aliphatic including ethylene and other α-olefins such as propylene, 1-butene, isobutylene, 1-hexene, 1-octene and 1-docecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are to be stabilized according to the invention, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

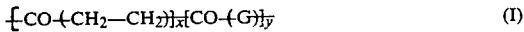 (I)

wherein G is the moiety of the second ethylenically unsaturated hydrocarbon of at least 3 carbon atoms polymerized through the ethylenic unsaturation and the ratio of y:x is no more than about 0.5. In the modification of the invention where copolymers are employed without the presence of the second hydrocarbon, the polymers are represented by the above formula I wherein y is zero. When y is other than zero, i.e., terpolymers are employed, the —CO—(CH$_2$CH$_2$)— units and the —CO—(G)— units are found randomly throughout the polymer chain and preferred ratios of y:x will be from about 0.01 to about 0.1. The end groups or "caps" of the polymer chain will depend upon what materials were present during the production of the polymer and how or whether the polymer has been purified. The end groups of the polymer are of little significance, however, so far as the overall properties of the polymer are concerned so that the polymer is fairly represented by the polymer chain as depicted above.

Of particular interest are the polymers of the above formula having a number average molecular weight of from about 1000 to about 200,000, especially those polymers of number average molecular weight from about 20,000 to about 90,000, as determined by gel permeation chromatography. The physical properties of the polymers are determined in part by the molecular weight, whether the polymer is a copolymer or a terpolymer and, in the case of terpolymers, the nature of and the proportion of the second hydrocarbon present. Typical melting points for such polymers are from about 175° C. to about 300° C., more often from about 210° C. to about 270° C. The polymers will have a limiting viscosity number (LVN), measured in a standard capillary viscosity measuring device in m-cresol at 60° C., of from about 0.5 dl/g to about 10 dl/g, preferably from about 0.8 dl/g to about 4 dl/g.

The polymers are produced by general methods of the above published European Patent Applications. Although the scope of the polymerization is extensive, and without wishing to be limited, a preferred catalyst composition is formed from a palladium compound, particularly a palladium alkanoate such as palladium acetate, the anion of a non-hydrohalogenic acid having a pKa less than 2, particularly trifluoroacetic acid or p-toluenesulfonic acid, and a bidentate ligand of phosphorus such as 1,3-bis(diphenylphosphino)propane or 1,3-bis[di(2-methoxyphenyl)propane. The reactants are typically contacted in the presence of the catalyst composition and a reaction diluent under polymerization conditions. Suitable reaction diluents include the lower alkanols such as methanol or ethanol and methanol is preferred. Typical polymerization conditions include a reaction temperature of from about 20° C. to about 150° C., preferably from about 50° C. to about 135° C. Suitable reaction pressures are from about 10 atmospheres to about 200 atmospheres but pressures from about 20 atmospheres to about 100 atmospheres are more frequently encountered. The contact of the reactants and the catalyst composition is maintained in a suitable reactor by conventional methods such as shaking or stirring. Subsequent to polymerization the reaction is terminated as by cooling the reactor and contents and by releasing the pressure. The polymer product is generally obtained as a material substantially insoluble in the product mixture and is recovered by well known procedures such as filtration or decantation. The polymer is used as recovered or is purified as by contact with a solvent or extraction agent selective for catalyst residues.

The polyketone polymers, according to the invention, are stabilized against the undue loss of crystallinity during melting/solidification cycles by the inclusion therein of a stabilizing quantity of a zinc aluminate and, optionally, the acidic polymer. The zinc aluminates that are effective stabilizers according to the invention are chemical combinations of zinc, aluminum and oxygen that are illustratively produced by coprecipitation of zinc and aluminum hydroxides from a strongly basic solution of zinc and aluminum salts. The combined precipitate is dried and on some occasions is calcined. The resulting product is a chemically combined oxide and/or hydroxide material of variable composition which qualitatively reflects the proportions of the zinc and aluminum in the solution from which the precipitate is formed. In a typical preparation, an aqueous mixture of zinc and aluminim salts, e.g., as the nitrates, is added to an aqueous solution rendered basic by the presence of ammonia, an ammonium salt such as ammonium carbonate, or sodium hydroxide. The resulting precipitate is recovered as by filtration and dried at a temperature above 100° C., e.g., from about 110° C. to about 120° C. It is useful on some occasions to complete the drying as by calcination at a higher temperature such as about 500° C. The proportions of zinc and aluminum in the zinc aluminate are qualitatively controlled by varying the relative concentrations of the zinc and aluminum ions in the solution from which the precipitate is formed. The zinc aluminate useful as stabilizer in the compositions of the invention suitably has an atomic Al/Zn ratio of from about 0.5 to about 9. Ratios below about 0.5 give inferior results as do ratios substantially above 9. Zinc aluminates wherein the atomic ratio of aluminum to zinc is from about 2 to about 5 are preferred.

The zinc aluminate is provided to the polyketone compositions in a stabilizing quantity. Suitable quantities of zinc aluminate are from about 0.01% by weight to about 5% by weight, based on total composition. Concentrations of zinc aluminate from about 0.05% by weight to about 2% by weight on the same basis are preferred.

It is useful on occasion to provide to the polyketone composition a stabilizing quantity of an acidic polymer containing moieties of an $\alpha$-olefin and an $\alpha,\beta$-ethylenically unsaturated carboxylic acid. The $\alpha$-olefin component of this optional stabilizer is an $\alpha$-olefin of up to 10 carbon atoms such as ethylene, propylene, 1-butene, isobutylene, 1-octene and 1-decene. Preferred $\alpha$-olefins are straight-chain $\alpha$-olefins of up to 4 carbon atoms inclusive, especially ethylene or propylene. Particularly preferred as the $\alpha$-olefin component of the acidic polymer is ethylene. This $\alpha$-olefin component will be present in at least 75% by mole based on the total acidic polymer and preferably is present in at least 85% by mol on the same basis.

The unsaturated carboxylic acid component of the acidic polymer is an $\alpha,\beta$-ethylenically unsaturated carboxylic acid of up to 10 carbon atoms inclusive and is illustrated by acrylic acid, methacrylic acid, 2-hexenoic acid, 2-octenoic acid and 2-decenoic acid. The preferred $\alpha,\beta$-ethylenically unsaturated carboxylic acids have up to 4 carbon atoms inclusive. These are acrylic acid, methacrylic acid and crotonic acid, of which acrylic acid is preferred. The content of the unsaturated acid in the acidic polymer is from about 1% by mole to about 25% by mole based on total acidic polymer. Amounts of unsaturated carboxylic acid from about 1% by mole to about 15% by mole on the same basis are preferred.

The acidic polymer is suitably a copolymer of the $\alpha$-olefin and the $\alpha,\beta$-unsaturated carboxylic acid and in general such copolymers are preferred. On occasion, however, it is useful to include within the acidic polymer an optional quantity of a third monomer, particularly a non-acidic, low molecular weight polymerizable monomer of up to 8 carbon atoms inclusive. Such optional third monomer of the acidic polymer may be an addtional $\alpha$-olefin such as styrene or propylene when the principal olefinic component is ethylene, an unsaturated ester such as vinyl acetate, methyl methacrylate or butyl acrylate, an unsaturated halohydrocarbon such as vinyl chloride or vinyl fluoride or an unsaturated nitrile such as acrylonitrile. As previously stated, the presence of a third monomer within the acidic polymer is not required. When a third monomer is present, however, amounts of the third monomer up to about 5% by mole based on total acidic polymer are satisfactory with amounts up to about 3% by mole on the same basis being preferred.

The presence of acidic polymer is not required in the stabilized compositions of the invention and the presence thereof is optional. When present, the precise amount of acidic polymer is not critical and amounts of acidic polymer up to about 5% by weight, based on total composition, are satisfactory, with amounts from about 0.05% by weight to about 3% by weight on the same basis being preferred.

The acidic polymers are known materials and are produced by known methods. A number of the acidic polymers are commercial. Suitable polymers of ethylene and methacrylic acid are marketed by Dow under the trademark PRIMACORE ® and polymers of ethylene and acrylic acid are marketed by DuPont under the trademark NUCREL ®.

The method of producing the compositions of the invention from the linear alternating polymer, the zinc aluminate and, optionally, the acidic polymer is not material so long as an intimate mixture of the materials is obtained. In one modification, the components in a finely divided form are dry-blended and co-melted as by passing the mixture through an extruder to produce the composition as an extrudate. In an alternate modification the compositions are produced in a mixing device operating at high shear and thermal energy. The compositions may contain other conventional additives such as colorants, plasticizers, fibers, fillers and mold release agents which are added to the polyketone polymer together with or separately from the other composition components.

The resulting stabilized polyketone polymer compositions will have an improved melt stability as evidenced by a relatively constant apparent crystallinity when subjected to melt processing operations of melting and solidification (crystallization). This improvement in retained apparent crystallinity offers considerable advantages which are not to be found when unstabilized polymers are utilized. For example, the stabilized composition is often formed as nibs by passage through an extruder. The nibs are then injection molded to produce a shaped article, in each case without substantial decrease in crystallinity as determined by a relatively constant melting point or other related physical property. The compositions of the invention ar particularly useful in this and other applications which require a series of melting and solidification cycles. While the compositions of the invention are usefully processed by conventional techniques which do not involve melting and solidification of the polymer the advantages of the stabilized compositions are most apparent when melt processing operations are to be employed. Thus, the compositions of the invention are useful in a variety of applications as engineering thermoplastics but are particularly useful in the production of shaped articles requiring a number of melting/solidification cycles. Illustrative of such articles are containers for food and drink and parts and housings for automotive applications.

The invention is further illustrated by the following Illustrative Embodiments which should not be regarded as limiting.

ILLUSTRATIVE EMBODIMENT I

A terpolymer of carbon monoxide, ethylene and propylene was produced in the presence of a catalyst composition formed form palladium acetate, trifluoroacetic acid and 1,3-bis[di(2-methoxyphenyl)phosphino]propane. The polymer had a melting point of 223° C. and a limiting viscosity number (LVN), measured in m-cresol at 60° C., of 1.81 dl/g.

ILLUSTRATIVE EMBODIMENT II

A number of zinc aluminates were produced by adding an aqueous solution of commercial grade aluminum and zinc nitrates to an aqueous solution of ammonia buffered to a pH of 9.8 with ammonium nitrate. The resulting precipitate was recovered by filtration, dried at approximately 120° C. for 24 hours and calcined at 500° C. for 2 hours. By varying the concentrations of aluminum nitrate and zinc nitrate in the solution from which the precipitate was formed, zinc aluminates having aluminum:zinc atomic ratios of from about 0.6 to about 5.1 were produced. The procedure was varied on some occasions by employing ammonium carbonate or sodium hydroxide in the precipitating solution in place of the ammonium nitrate or ammonia. Some of the zinc aluminates were dried according to the above procedure but were not calcined.

Compositions were produced from the terpolymer of Illustrative Embodiment I and various zinc aluminates. On certain occasions there was also present NUCREL ® 535, a commercially available copolymer of ethylene and acrylic acid marketed by DuPont. The compositions were typically produced by cryogrinding the terpolymer (as nibs) to a finely divided state, adding stabilizer and tumbling the mixture overnight in nitrogen. The mixture was then extruded through an extruder operating at 275° C. in air.

ILLUSTRATIVE EMBODIMENT III

Measurements of the melting points and the crystallization temperatures of the compositions produced by the procedures of Illustrative Embodiment II, as well as the heats of melting and heats of fusion, were made with the use of a Perkin-Elmer DSC 7 differential scanning calorimeter (DSC) which employs samples of the polymeric compositions or of the unstabilized terpolymer, which was employed as a control, in sealed pan containers. The pan and contents are heated at a controlled rate, typically 20° C./minute, until reaching the temperature at which the sample melts, $T_m1$. The pan and contents are then cooled to the temperature at which the sample solidifies, $T_c1$, is reached and then heated past the second melting point, $T_m2$, to 285° C. at which temperature the sample is maintained for 10 minutes. The pan and contents are then cooled until the sample has solidified a second time, $T_c2$. The melting and crystallization temperatures are defined as the temperatures at which the heat flow reaches a maximum (for melting) or a minimum (for crystallization). Typically, the melting point $T_m$ will be higher than the temperature of crystallization $T_c$ and each will decrease somewhat with repeated melting and solidification. Although a number of factors influence the melting point and crystallization temperature, these values are influenced by the crystallinity of the polymer. In general, the smaller the difference between the first and second melting points or the first and second crystallization temperatures, the greater the degree of retained crystallinity.

It is also possible to determine through the use of the DSC the magnitude of the first and second heats of melting ($H_1$ and $H_2$) in cal/g and the first and second heats of crystallization ($C_1$ and $C_2$), also in cal/g, for the terpolymer and for the stabilized compositions. In general, the heats of crystallization will be higher for the stabilized composition than for the unstabilized terpolymer. The higher the ratio $C_2/C_1$ is, the greater the degree of retained crystallinity. The results of the measurements are shown in the following Tables, where the designation D is used to indicate a composition in which the zinc aluminate was merely dried and the designation C indicates a composition in which the zinc aluminate had been dried and calcined. Also in the Table, the form of the zinc aluminate is provided wherein A represented a zinc aluminate of the general form $ZnO.Al(OH)_3$ and B represents a zinc aluminate of the general form $ZnO.Al_2O_3$.

TABLE 1

| Sample | % wt Zinc Aluminate, Al:Zn ratio | $T_C^2$ | $C_2/C_1$ | $H_2/H_1$ |
|---|---|---|---|---|
| Terpolymer | 0 | 147.2 | 0.65 | 1.15 |
| Composition A,C | 0.3%, 3:1 | 170.2 | 0.90 | 0.95 |
| Composition A,D | 0.3%, 1.3:1 | 170.2 | 0.91 | 1.05 |
| A,C | 0.3%, 1.3:1 | 165.5 | 0.87 | 1.03 |
| Composition A,D | 0.3%, 1.4:1 | 163.4 | 0.83 | 0.97 |
| A,C | 0.3%, 1.4:1 | 164.4 | 0.86 | 1.07 |

TABLE 2

| Sample | % wt Zinc Aluminate, Al:Zn ratio | $T_C^2$ | $C_2/C_1$ | $H_2/H_1$ |
|---|---|---|---|---|
| Terpolymer |  | 164.1 | 0.83 | 0.95 |
| Composition B,D | 0.3%, 1:1 | 158.8 | 0.76 | 0.96 |
| B,C | 0.3%, 1:1 | 136.2 | 0.56 | 0.96 |
| Composition B,D | 0.3%, 3:1 | 167.7 | 0.87 | 1.02 |
| B,D | 0.3%, 3:1 | 162.2 | 0.81 | 1.01 |

What is claimed is:

1. A stabilized polymer composition comprising a linear alternating polymer of carbon monoxide and at least one ethylenically unsaturated hydrocarbon having incorporated therein a stabilizing quantity of a zinc aluminate and, optionally, an acidic polymer containing moieties of an α-olefin and an α,β-ethylenically unsaturated carboxylic acid.

2. The composition of claim 1 wherein the linear alternating polymer is represented by the repeating formula

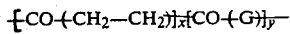

wherein G is the moiety of an ethylenically unsaturated hydrocarbon of at least 3 carbon atoms polymerized through the ethylenic unsaturation thereof and the ratio of y:x is no more than about 0.5.

3. The composition of claim 2 wherein the atomic ratio of aluminum:zinc in the zinc aluminate is from about 0.5:1 to about 9:1.

4. The composition of claim 3 wherein the acidic polymer is a copolymer of ethylene and acrylic acid or methacrylic acid.

5. The composition of claim 4 wherein y is zero.

6. The composition of claim 5 wherein the zinc aluminate is present in a quantity of from about 0.01% by weight to about 5% by weight, based on total composition.

7. The composition of claim 6 wherein the acidic polymer is present in a quantity of up to about 5% by weight, based on total composition.

8. The composition of claim 4 wherein G is a moiety of propylene and the ratio of y:x is from about 0.01 to about 0.1.

9. The composition of claim 8 wherein the zinc aluminate is present in a quantity of from about 0.01% by weight to about 0.5% by weight based on total composition.

10. The composition of claim 9 wherein the acidic polymer is present in a quantity of up to about 5% by weight, based on total composition.

11. The composition of claim 10 wherein the atomic ratio of aluminum:zinc in the zinc aluminate is from about 2:1 to about 5:1.

12. The composition of claim 11 wherein the acidic polymer is a copolymer of ethylene and methacrylic acid.

13. The composition of claim 11 wherein the acidic polymer is a copolymer of ethylene and acrylic acid.

14. The composition of claim 13 wherein the acidic polymer is present in a quantity of from about 0.05% by weight to about 3% by weight based on total polymer.

15. A composition as in claim 1 wherein said zinc aluminate is represented by the general formula $ZnO.Al(OH)_3$.

16. A composition as in claim 1 wherein said zinc aluminate is represented by the general formula $ZnO.Al_2O_3$.

17. A stabilized polymer composition comprising a linear alternating polymer of carbon monoxide and at least one ethylenically unsaturated hydrocarbon having incorporated therein a stabilizing quantity of zinc aluminate represented by the general formula $ZnO.Al(OH)_3$, and optionally, an acidic polymer containing moieties of an α-olefin and an α,B-ethylenically unsaturated carboxylic acid.

* * * * *